June 2, 1964 W. S. PEPPLER 3,135,424
DISPENSING AND DENESTING APPARATUS
Filed Oct. 11, 1962 3 Sheets-Sheet 1

INVENTOR.
WILLIAM S. PEPPLER,
BY Karl W. Flocks

ATTORNEY.

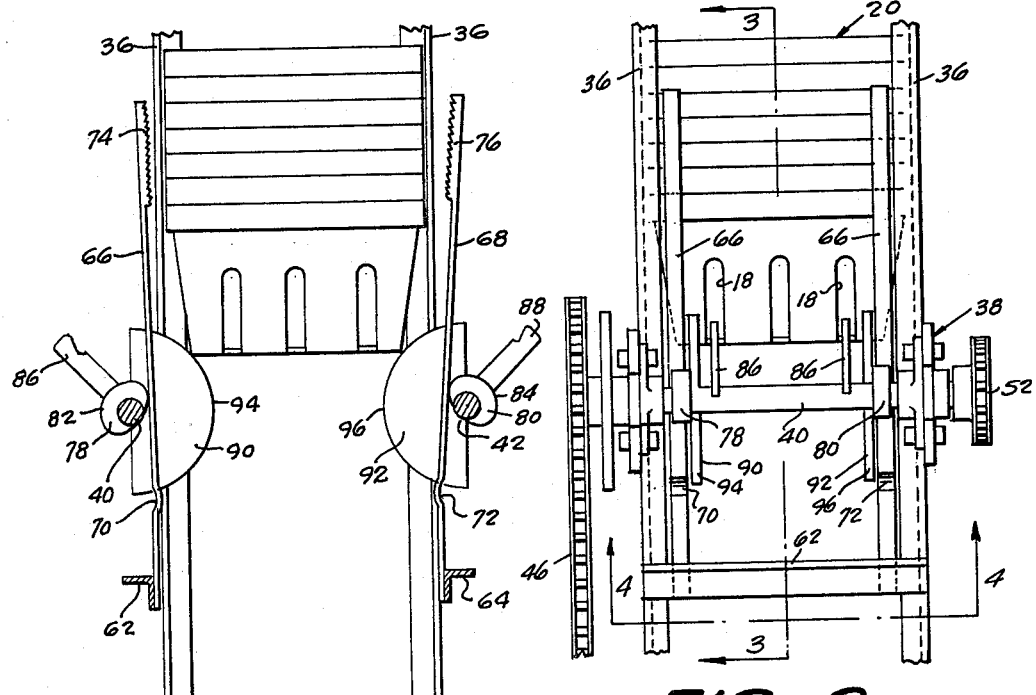
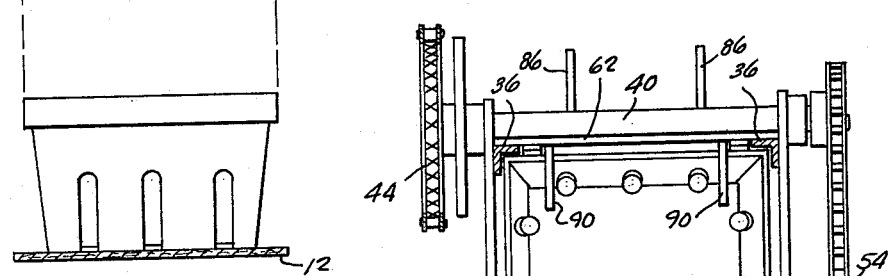
FIG. 3.
FIG. 4.
INVENTOR.
WILLIAM S. PEPPLER,
BY
ATTORNEY.

June 2, 1964        W. S. PEPPLER        3,135,424
DISPENSING AND DENESTING APPARATUS
Filed Oct. 11, 1962        3 Sheets-Sheet 3
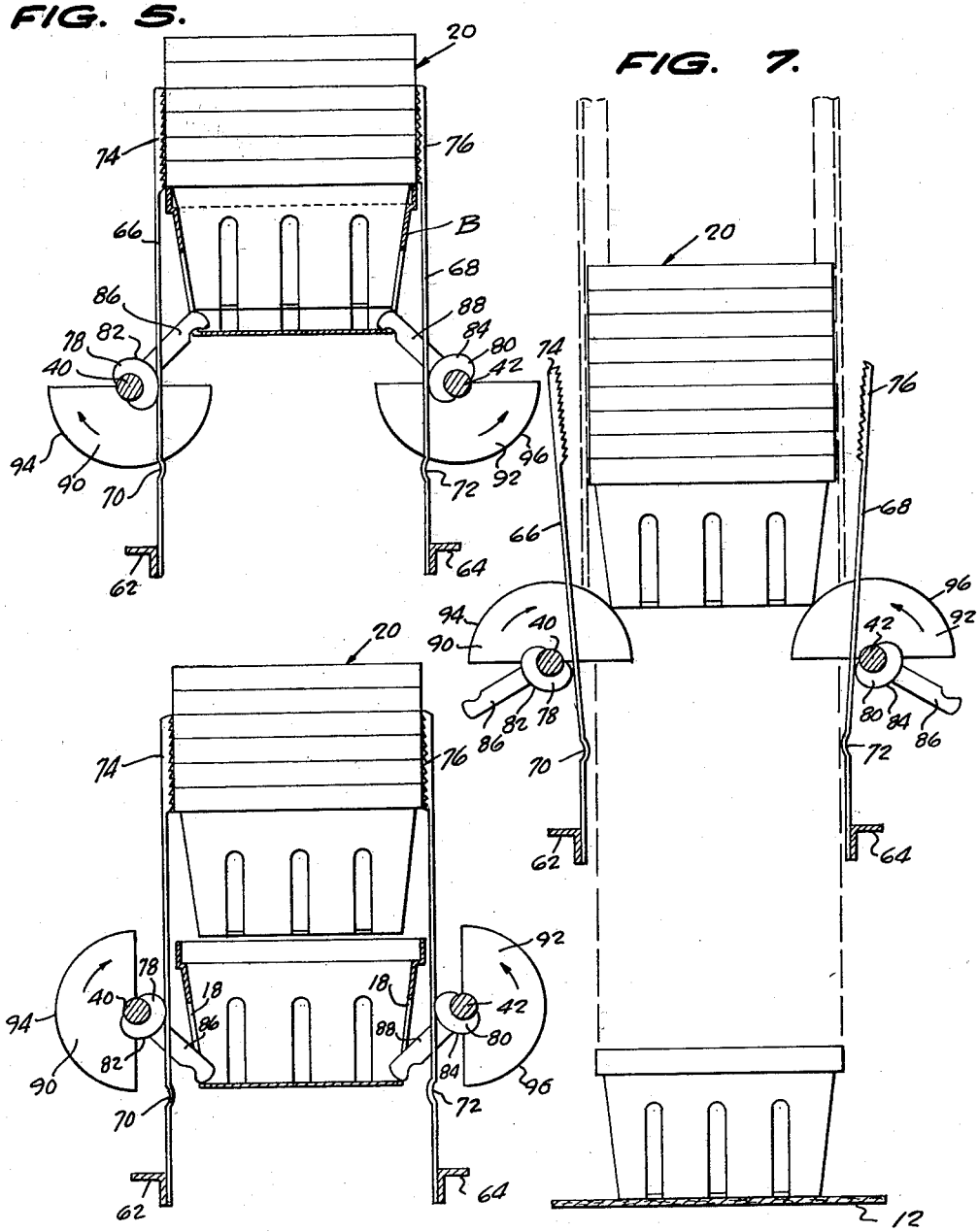
INVENTOR.
WILLIAM S. PEPPLER,
BY
ATTORNEY.

United States Patent Office 3,135,424
Patented June 2, 1964

3,135,424
DISPENSING AND DENESTING APPARATUS
William S. Peppler, Chappaqua, N.Y., assignor to Diamond National Corporation, New York, N.Y., a corporation of Delaware
Filed Oct. 11, 1962, Ser. No. 229,918
8 Claims. (Cl. 221—222)

This invention relates generally to dispensing apparatus and is more particularly concerned with an improved dispensing and denesting apparatus especially adapted for use in separating and dispensing one-by-one a vertical stack of nested berry baskets.

The basic problem in denesting berry baskets, particularly those formed from molded pulp, is that the baskets of the character involved generally include an upper peripheral lip which nests or rests tightly in alignment against the similar lip of the next adjacent basket. These baskets generally have smooth sides in vertical grooves therein, are difficult to separate and orient with respect to mechanical dispensing means.

The packing of berries, grapes or other types of fruits and vegetables has become highly mechanized. The manual loading and packing of the baskets in very large installations is excessively expensive in view of the rising labor costs, and there has been a trend to mechanize, as much as possible, the packing of fresh fruits and vegetables.

The primary object of the present invention is to provide novel basket dispensing and denesting apparatus which will accommodate a vertical stack of nested baskets in a magazine, retain the vertical stack in a position to be dispensed one-by-one from the bottom thereof, and which includes means for periodically retaining all but the lowermost basket in the magazine, and permitting novel engaging means to periodically support the nested stack whereby the lowermost basket is denested from the next adjacent basket and dropped therebelow.

Another object in the present invention is to provide novel basket dispensing and denesting apparatus which includes periodically operated stack gripping means coordinated in operation with primary stack positioning cam means and secondary stack-release cam means in conjunction with basket picker finger means.

Other objects in the nature and advantages of the instant invention will be apparent from the following description taken in conjunction with the accompanying drawings wherein:

FIG. 2 is a fragmentary side elevation of the essential functioning portions of the apparatus shown in FIG. 1, looking into the nearest side of the apparatus in FIG. 1, portions being removed for purposes of clarity;

FIG. 3 is a vertical section taken substantially on the plane of line 3—3 of FIG. 2;

FIG. 4 is a bottom plan view taken substantially on the plane of line 4—4 of FIG. 2;

FIG. 5 is a view similar to FIG. 3, showing the manner in which the picking fingers, and secondary cam means of the apparatus function;

FIG. 6 is a view similar to FIGS. 3 and 5 showing another position of the cooperating parts whereby the lowermost basket has been denested;

FIG. 7 is a view similar to FIGS. 3, 5 and 6 showing the cooperating parts in another position of orientation.

Figure 1:
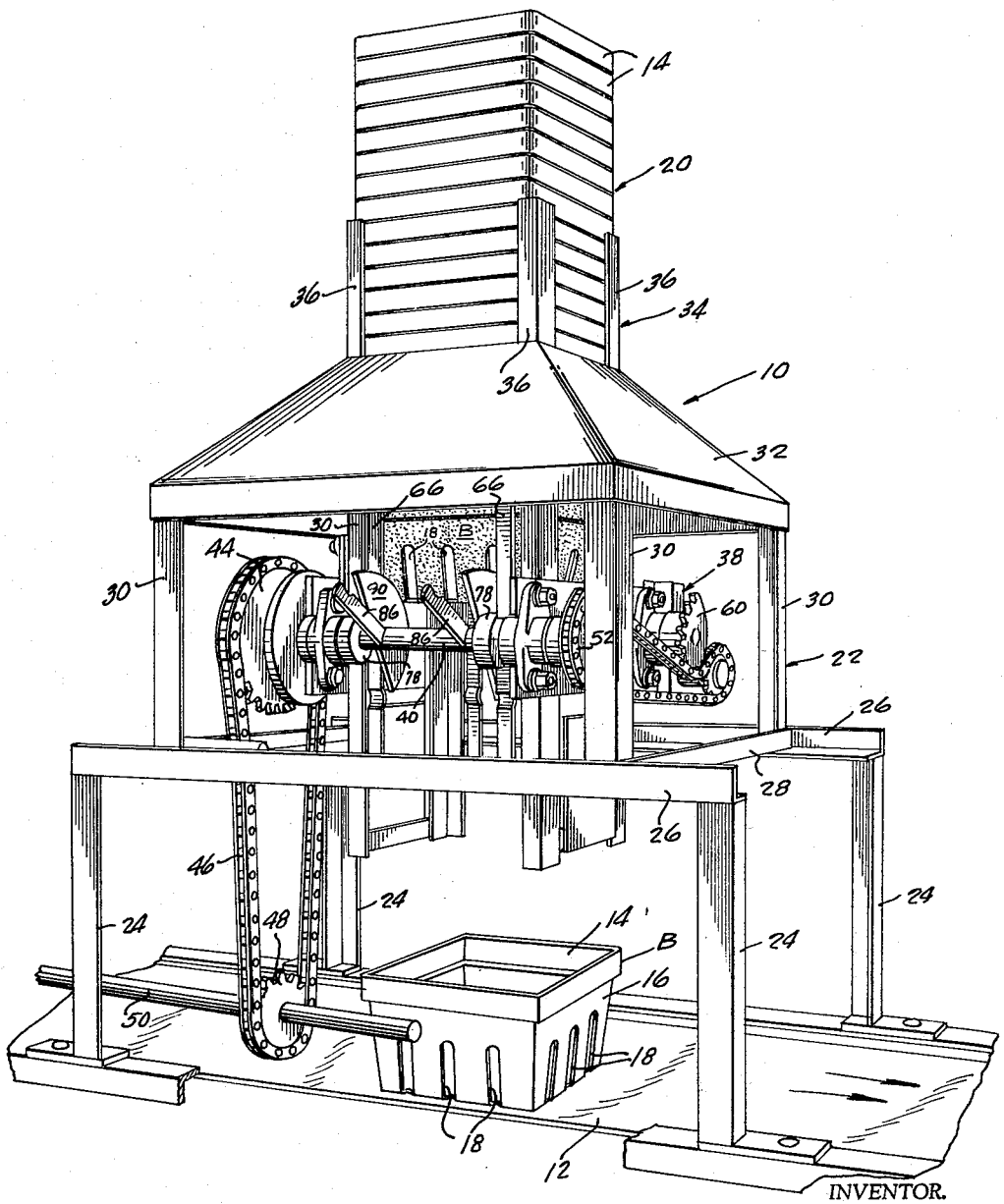
FIG. 1 is a perspective view of the dispensing and denesting apparatus of the invention in relation to a fragmentary portion of a basket conveyor.

Referring to the drawings in detail, and first considering FIG. 1, an exemplary embodiment of the dispensing and denesting apparatus is indicated generally at 10 and is shown in relation to a fragmentary portion of a horizontal conveyor run 12 upon which a berry basket B will be deposited.

The berry baskets B, it will be noted, include converging side walls 16 having a plurality of vertically extending slots 18 terminating slightly in the basket bottom. When the baskets B are nested in a stack as indicated generally at 20 in the upper portion of FIG. 1, it will be noted that the peripheral collars 14 of the adjacent baskets are tightly nested, and generally there is very little clearance between adjacent abutting portions of the peripheral flanges, or lips.

The apparatus 10 includes a support indicated generally at 22 comprising vertically extending legs 24, horizontal support angles 26 connected by transverse support members 28. The horizontal supports 26 and 28 have extending therefrom vertical legs 30 supporting a truncated upper housing portion 32 providing support means for a vertically extending, uninterupted magazine means indicated generally at 34. The magazine means consists of inwardly opening corner-forming angle elements 36 which substantially conform to the corner configuration of the stack of baskets 20; see FIG. 4.

The legs 30 will generally be enclosed, and although one type of support has been described, the support may be of any suitable character. Likewise, the magazine means 34 may take one or other suitable forms.

Located adjacent to the lower portion of the magazine means 34 and support on the angle members 36 forming the same is a stack-retention-and-picker assembly indicated generally at 38. The assembly 38 comprises a pair of opposed, parallel shafts 40 and 42, the shaft 42 including on one end thereof a sprocket 44 over which is entrained an endless link chain 46 engaging a drive sprocket 48 fixed to a drive shaft 50.

Fixed to the other end of the shaft 40 is a sprocket 52 which has entrained thereover a second link chain 54 trained over an idler sprocket 56 carried on a suitably supported stub shaft 58. The shaft 42 includes at the end thereof in alignment with the link chain 54 a sprocket 60 engaging the outer run of the link chain 54; see FIG. 1, whereby the shafts 40 and 42 and counter-rotated, i.e., rotate inwardly simultaneously as indicated by the direction arrows in FIGS. 3 and 5–7.

It will be noted that the magazine means, i.e., angle members 36, depend a considerable distance below the assembly 38 in order to properly guide a separated basket B onto the conveyor run 12.

Extending parallel to the shafts 40 and 42 and disposed therebeneath are support angle elements 62 and 64, respectively. Each of the support angles 62 and 64 have fixed thereto vertically extending gripper means which comprise elongated leaf spring or bar elements 66 and 68. The leaf spring bars or elements 66 and 68 each include an intermediate bend 70 and 72, respectively, which have a permanent set normally urging the upper ends of the bars away from the vertical path traveled defined by the vertically disposed magazine means 34. Although leaf spring elements are disclosed in this exemplary embodiment, other means may be utilized for urging the basket gripper means away from the vertical path of travel of the magazine means.

Each of the bar or strap elements 66 and 68 includes, at the upper end thereof elongated gripping pads 74 and 76, respectively, which will engage a plurality of the lowermost baskets in the vertical stack 20; see FIG. 2.

The shafts 40 and 42 have fixed thereon in alignment with the outer surface of the leaf spring straps and bars 66 and 68 secondary cam means 78 and 80, respectively, which include an enlarged lobe or peripheral edge portion 82 and 84 disposed at one side of the axis of rotation of the respective shafts 40 and 42 and which will be effective to urge the bars; i.e. the gripping plates 74 and 76, respectively, into gripping engagement with the lowermost baskets as shown for example in FIGS. 5 and 6.

Additionally, the shafts 40 and 42 have fixed thereon radially extending stripping finger means 86 and 88 extending intermediately of the lobe portions 82 and 84 and in substantial alignment with the outermost vertical slots 18 of the baskets of the nested stack 20; see FIG. 2. The stripping finger means 86 and 88 will be effective to extend to the vertical slots 18 during rotation of the shafts 40 and 42 as clearly seen in FIG. 5, for the purpose of stripping the lowermost basket B from the stack of baskets as seen in FIGS. 5 and 6. It will be noted that the gripping pads 74 and 76 are of such a length that all but the lowermost basket B will be gripped thereby; note FIG. 5.

Additionally, the shafts 40 and 42 are fixed thereon substantially semi-circular primary orienting cams 90 and 92, respectively, which include an arcuate support surface 94 and 96, respectively, which are effective to engage and support the entire stack of nested baskets at the lowermost stack as seen in FIGS. 3 and 7. It will be noted in these views that the gripping means or pads 74 and 76 are not urged into gripping engagement with the lowermost baskets when the cams 90 and 92 support the stack.

Operation

A stack of nested baskets 20 is disposed in the magazine means 34, the lowermost basket engaging the outer periphery of the primary cam means 90 and 92. When the stack of baskets is supported in this manner, the gripping pads 74 and 76 are oriented by the cam lobes 82 and 84 of the secondary cam means 78 and 80, respectively, to assume their normal position, i.e., away from or out of the vertical path of travel of the baskets in the magazine means. As the shafts 40 and 42 are counter-rotated in the manner indicated by the direction arrows in FIG. 7, the finger means 86 and 88 will enter the vertical slots 18 of the lowermost basket after the cam lobes 82 and 84 of the secondary cam means 78 and 80, urge the spring levers 66 and 68 inwardly, so that the gripping pads 74 and 78 engage approximately 4 of the baskets immediately above the lowermost basket B. It will be noted that the baskets are no longer supported by the primary cam means, and continued rotation of the shafts 40 and 42 from the position shown in FIG. 5 to that of FIG. 6 will result in the lowermost basket B being stripped off of the stack as the finger means 86 and 88 move through an orbit which extends into the vertical path of travel of the magazine means and into the slots 18 of the lowermost basket.

At this time, it will be noted that the cam lobes 82 and 84 of the secondary cam means are continuing to urge the gripping pads 74 and 76 into gripping and supporting relationship to the stack of baskets 20.

Continued rotation of the shafts 40 and 42 from the position shown in FIG. 6 to that of FIG. 7, results once more in the peripheral portion of the primary cam means 90 and 92 moving beneath the next lowermost basket, and substantially at the same time, the cam lobes 82 and 84 of the secondary cam means permits bars 66 and 68 to assume their normal position, and the gripping pads 74 and 76 will no longer grip and support the nested stack of baskets.

Although not shown, the dispensing or stripping of the lowermost baskets may be controlled by suitable single-revolution clutch means operatively connected to the drive shaft 50, and coordinated in operation with subsequent filling mechanism that occurs with respect to the baskets which have been dispensed on the conveyor run 12.

Although the preferred embodiment discloses spring levers 66, 68 normally biased away from the opposite sides of the vertical path of travel of articles being dispersed, functional equivalents are to be considered within the scope of the invention. For example, where the gripping pads are normally urged toward the vertical path of travel and appropriate cams controlled the timed movement thereof, etc.

It will be obvious to those skilled in the art that various changes may be made without departing from the scope of the invention and therefore the invention is not intended to be limited to what is shown in the drawings and described in the specification but only as set forth in the appended claims.

What is claimed is:

1. A basket dispenser and denester apparatus comprising support means including vertically disposed magazine means having an uninterrupted path of travel for containing a vertical stack of nested baskets wherein said baskets have an upper peripheral collar and vertical slots in opposed side walls thereof, and stack-retention-and-picker assembly on said support means, said assembly including gripper means normally oriented away from opposite sides of the vertical path of travel of said magazine means for engaging the peripheral collar of the baskets above the lowermost basket in said magazine means and supporting the nested stack of baskets against descent in said magazine means, stack positioning primary cam means disposed beneath said gripper means, secondary cam means movable with said primary cam means, said secondary cam means operatively engaging said gripper means for periodically positioning said gripper means in gripping relation with the baskets, picker finger means movable with said cam means and periodically movable through an orbit intersecting the vertical path of travel of said magazine means for engaging within the vertical side wall slots of the lowermost basket to engage a bottom wall and denest it from the next adjacent basket, and drive means connected to said primary cam means, secondary cam means and picker finger means rotating the same simultaneously and synchronously.

2. The structure of claim 1 in which said gripper means comprises opposed pressure pads supported on vertically extending bar elements displaceable laterally from the vertical path of travel of said magazine means.

3. The structure of claim 2 in which said bar elements comprise leaf springs having a permanent set and extending upwardly and outwardly along the vertical path of travel of said magazine means.

4. The structure of claim 1 in which said primary cam means comprises at least a pair of vertical discs mounted on parallel axes of rotation outwardly of the vertical path of travel of said magazine means, said discs including an arcuate periphery for engaging the lowermost basket in said magazine means and supporting the nested stack therein.

5. The structure of claim 4 in which the secondary cam means comprises at least one cam element mounted on each of the axes of rotation of said discs and including edge portions effective to actuate the gripper means to move to a basket-disengaging position when the arcuate periphery of said discs support said nested stack of baskets.

6. The structure of claim 4 in which said picker finger means comprise at least one lever element projecting radially from the axis of rotation of each of said discs and disposed in radially coordinated relation with respect to both said cam means.

7. The structure of claim 6 in which said bar elements comprise elongated leaf springs having a permanent set diverging upwardly from the vertical path of travel of said magazine means.

8. The structure of claim 7 in which said secondary cam means comprise a cam element mounted on the axis of rotation of each of said discs and include portions effective to actuate said leaf springs to move to a basket disengaging position when the peripheral portion of the primary cam means is disposed beneath said nested stack of baskets.

References Cited in the file of this patent

UNITED STATES PATENTS

| | | |
|---|---|---|
| 2,738,899 | Hansen et al. | Mar. 20, 1956 |
| 2,942,758 | Hogstrom | June 28, 1960 |
| 2,974,828 | Matteson | Mar. 14, 1961 |